United States Patent [19]
Kuhne

[11] Patent Number: 5,088,964
[45] Date of Patent: Feb. 18, 1992

[54] VISCOUS DAMPER ASSEMBLY FOR A FLYWHEEL ASSEMBLY INCLUDING FRICTION PLATES

[75] Inventor: Viktor Kuhne, Bopfingen, Fed. Rep. of Germany

[73] Assignee: J. M. Voith GmbH, Fed. Rep. of Germany

[21] Appl. No.: 452,687

[22] Filed: Dec. 15, 1989

[30] Foreign Application Priority Data

Dec. 15, 1988 [DE] Fed. Rep. of Germany ....... 3842154
Nov. 15, 1989 [DE] Fed. Rep. of Germany ....... 3937957

[51] Int. Cl.$^5$ .......................... F16D 3/14; F16D 3/66; F16D 3/80
[52] U.S. Cl. .................................. 464/68; 192/106.2; 464/24
[58] Field of Search ............... 464/24, 27, 66, 67, 464/68; 192/106.1, 106.2; 74/574

[56] References Cited

U.S. PATENT DOCUMENTS

| | | | |
|---|---|---|---|
| 4,351,167 | 9/1982 | Hanke et al. | 464/24 |
| 4,662,239 | 5/1987 | Wörner et al. | 192/106.2 X |
| 4,782,718 | 11/1988 | Hartig et al. | 192/106.2 X |
| 4,904,225 | 2/1990 | Worner et al. | 192/106.2 X |

FOREIGN PATENT DOCUMENTS

| | | |
|---|---|---|
| 3641962 | 12/1986 | Fed. Rep. of Germany . |
| 3721712 | 1/1988 | Fed. Rep. of Germany . |
| 2160296 | 12/1985 | United Kingdom .............. 464/64 |

Primary Examiner—Daniel P. Stodola
Assistant Examiner—William G. Battista, Jr.
Attorney, Agent, or Firm—Ostrolenk, Faber, Gerb & Soffen

[57] ABSTRACT

An elastic coupling, particularly for a multi-mass flywheel in the drive train of a motor vehicle drive. The elastic coupling has three masses which are connected to each other in each case by spring elements, a damping device being connected in parallel with each spring element. The damping device between the first and the second masses includes radially extending projections on the second mass which exert either a circumferential force on the first springs or a damping force in an adjacent fluid displacement chamber. The side walls of the fluid displacement chambers simultaneously serve as retaining shoulders for the springs in the adjacent spring chambers whereby the projections can carry out the above-mentioned dual functions. A great advantage of this arrangement is a particularly advantageous space-spacing arrangement of the damping device in the radially outer region of the elastic coupling.

9 Claims, 3 Drawing Sheets

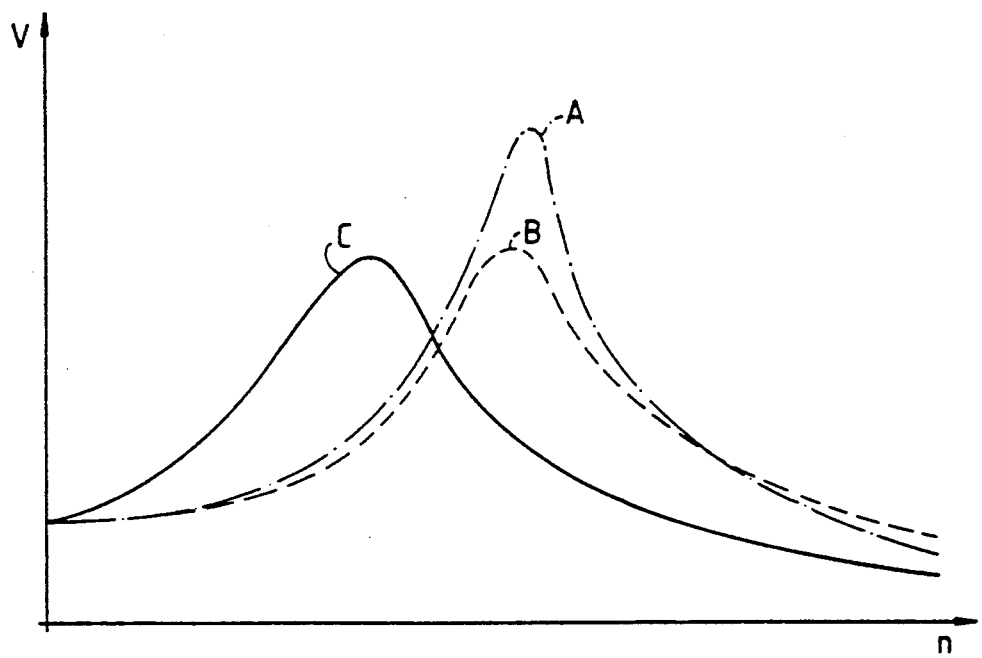
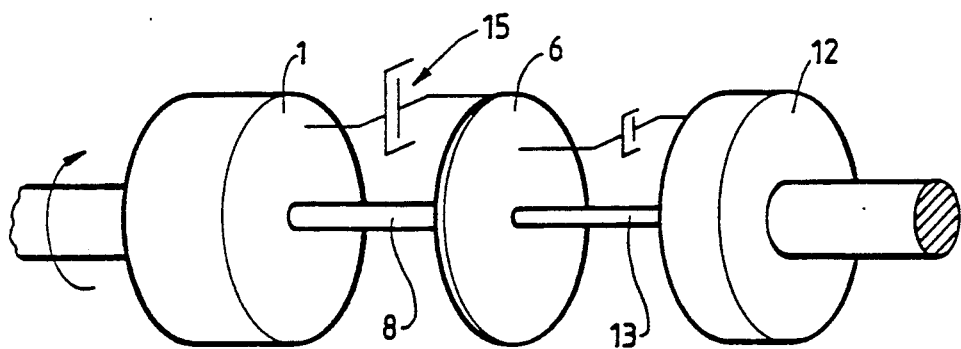
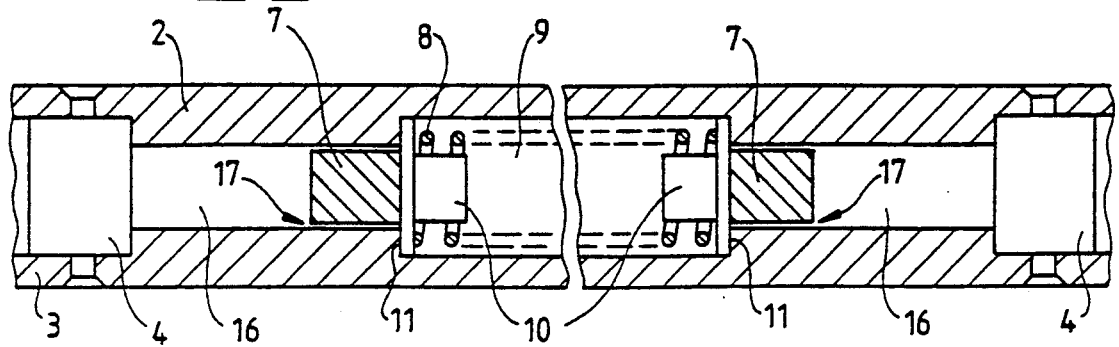

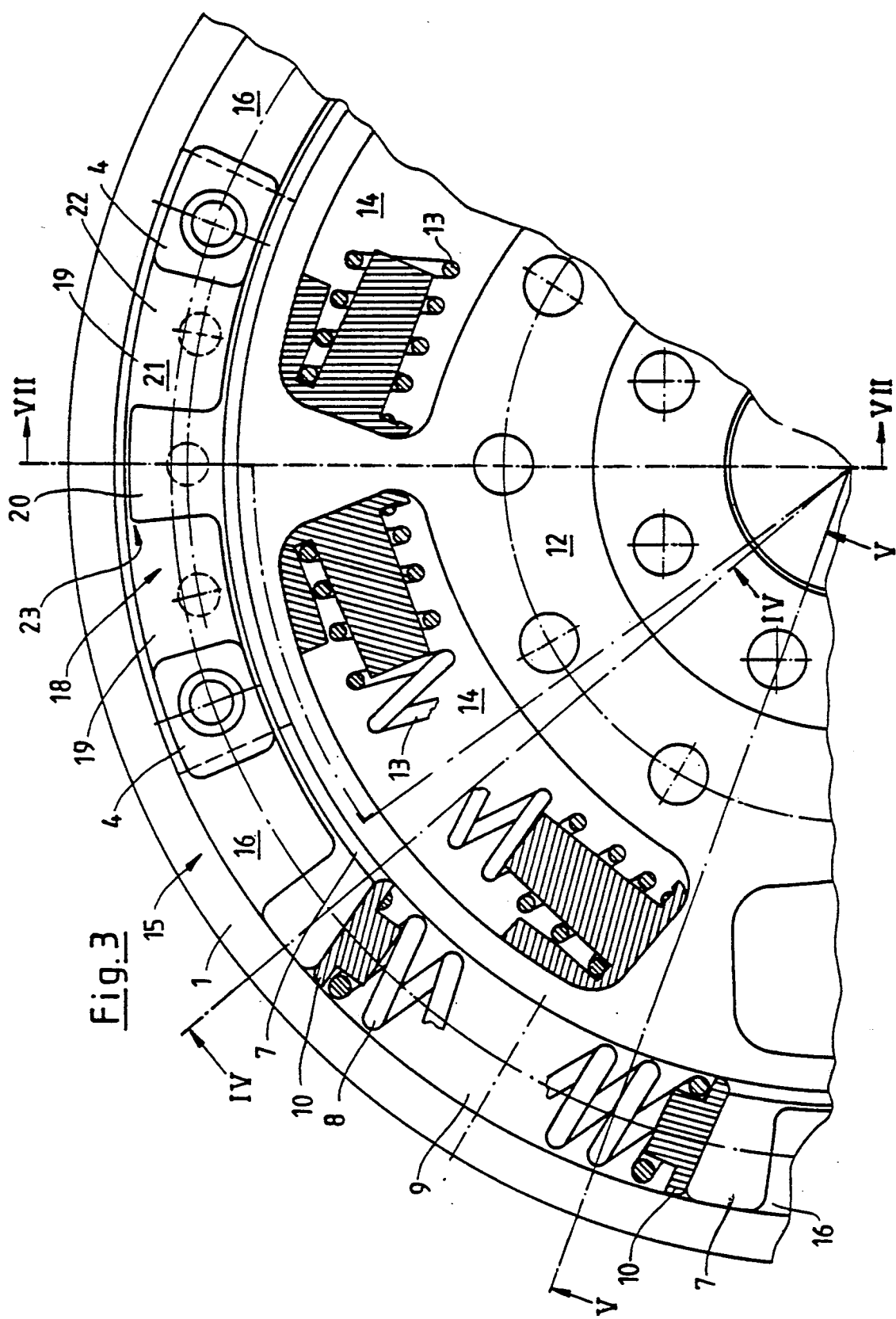

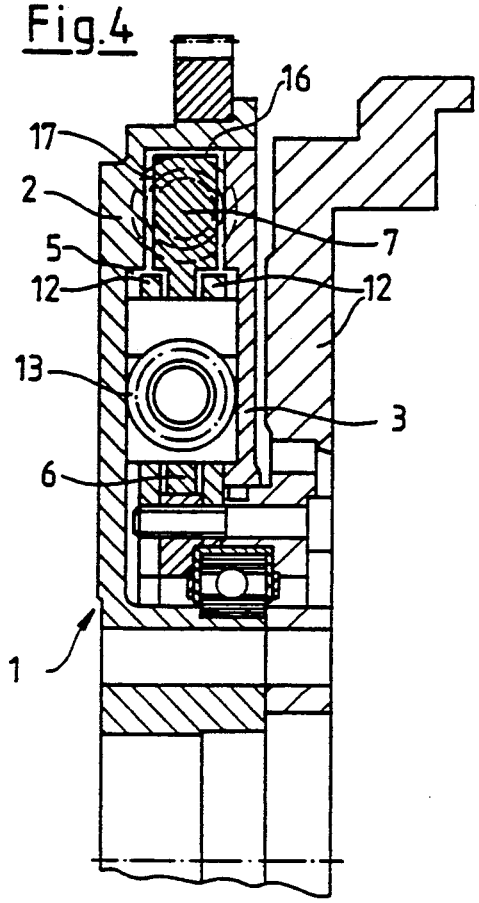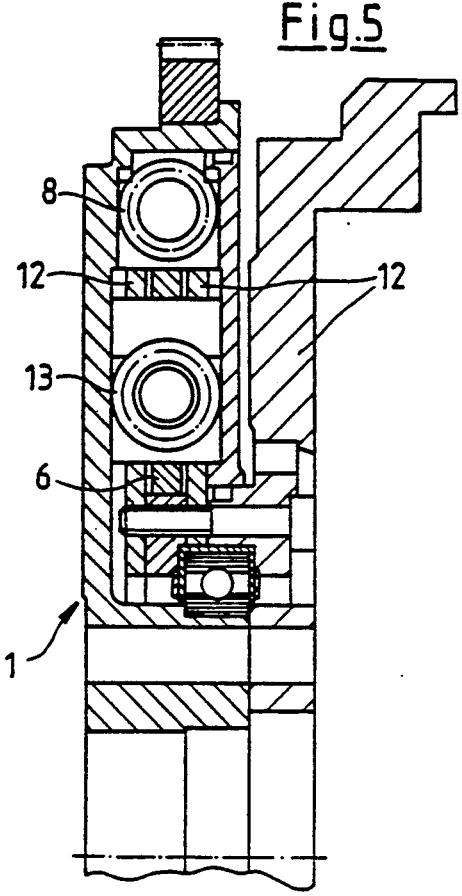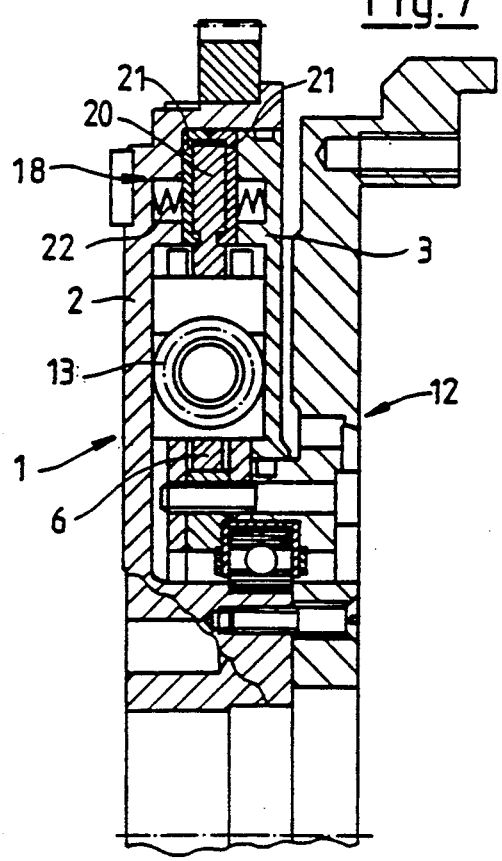

VISCOUS DAMPER ASSEMBLY FOR A FLYWHEEL ASSEMBLY INCLUDING FRICTION PLATES

BACKGROUND OF THE INVENTION

The present invention relates to an elastic coupling, and particularly an elastic coupling for a multi-mass flywheel in the drive line of a motor vehicle driven by an internal combustion engine One elastic coupling of background interest is disclosed in Federal Republic of Germany OS 37 21 712. This known elastic coupling has a first mass which is associated with the drive engine and a third mass which is associated with the following transmission. Between the first and third masses is a second mass which is connected, separated from each of the first and third masses, via first and second springs. The masses are connected in each case in series via the springs in the direction of the flow of power. The spring arranged between the first mass and the second mass is a coil spring which expands in circumferential direction over a large angular region.

As a damping device, a substantially toroidally curved spring chamber is provided, the walls of which rest closely along the outer circumference of the spring turns. The coil spring contained in the spring chamber is supported in the circumferential direction by axial lugs. When the first and second masses turn relative to one another under the action of torque, a damping medium present in the spring chamber is displaced into adjacent regions of the interior space of the elastic coupling. The damping medium in this case flows through the inside of the coil spring past the spring support The cross-sections are, in this connection, very large, which can produce only a slight damping of the oscillations. If the damping medium is displaced out of the spring chamber it can only flow back again with a time delay, predominantly by centrifugal force, if the volume of the spring chamber changes only slightly under operating conditions with small amplitudes of oscillation. The known elastic coupling thus does not have the required damping properties under all conditions of operation and at all temperatures.

In addition, there is no way of adequately varying the damping force as a function of the angle of rotation. In particular, the damping force is constant at all angles of rotation. There is no suggestion of any adaptation of the damping energy or force to engine performance of torque, nor to the operating conditions of the vehicle drive.

Federal Republic of Germany Patent 28 48 748, which is equivalent to U.S. Pat. No. 4,351,167, discloses an elastic coupling which is provided on the periphery of the inner space with a plurality of displacement chambers of variable volume within which the damping medium is forced through throttle slots when the two elastic coupling halves turn, depending on the load. The damping of rotary oscillations inherent therein is substantially constant over the angle of turn. The damping force can be adapted to some extent as a function of the angle of turn with this elastic coupling, but still insufficiently in critical applications. See FIG. 4 and the steps 46, 49 in the throttle slots 45, 48. The main problem is obtaining optimal damping when idling and under partial load, under noncritical resonance conditions Slight damping is required when idling, with partial and full loads and when the vehicle is being pushed, while high damping is required when passing through the resonant speed of rotation and when the load changes. The structural form of this known displacement chamber also does not permit its installation in a multi-mass flywheel because of considerations of space.

Federal Republic of Germany Patent 36 41 962 discloses a solution which mechanically achieves a decoupling of oscillation when passing through the critical resonance region. The solution contemplated is, however, very cumbersome from a structural standpoint.

The disclosures of the prior art materials discussed herein are incorporated by reference.

SUMMARY OF THE INVENTION

In view of the foregoing deficiencies of the prior art, the principal object of the present invention is to develop an elastic coupling of this type wherein the amplitude of oscillation, both when passing through the resonance region and in other different operating regions, can be kept smaller than heretofore.

A further object is to achieve this with the smallest possible requirement of space and construction.

These and other objects are achieved by a disk-type elastic coupling for use in a multi-mass flywheel in the drive train of a motor vehicle with an internal combustion engine, wherein a) a first elastic coupling half for connection to the engine constitutes a first mass and has at least two mutually opposing side disks which have a common axis defining an axial direction, and which form a liquid-tight inner space which can be filled with a damping fluid;

b) within the inner space is a second mass which is guided at its circumferential region against axial displacement by the side disks and is connected to the first mass via first elastic means;

c) within the inner space is a third mass for connection to further drive train equipment such as a transmission, the third mass representing a second elastic coupling half and being connected to the second mass via second elastic means;

d) the three masses are connected in series in the direction of transmission of the engine force via the first and second elastic means and are turnable to a limited extent with respect to each other;

e) at least one damping means comprising a fluid displacement chamber for said damping fluid is defined in said inner space and is connected in parallel with at least one of the elastic elements;

f) the second mass has projections fixed thereon for rotation with it, each of them extending into one of the fluid displacement chambers;

g) each two adjacent projections form a pair of projections and enclose between them one of the elastic means;

h) each two adjacent displacement chambers enclose between them a spring chamber;

i) each spring chamber has a greater inside diameter than the two adjoining displacement chambers in order to form an axial shoulder at each end of said spring chamber; and j) each elastic means is retained in its respective spring chamber by a pair of spring plates which rest against the axial shoulders.

More generally, an elastic coupling for use in the drive train of a motor vehicle, comprises a first mass and means for connecting the same to receive torque from an engine of said motor vehicle, said first mass being rotatable about an axis thereby defining an axial direction;

a second mass which is also rotatable about said axis and means for transmitting engine torque from said first mass to said second mass;

stop means on said first mass and projection means on said second mass; elastic means retained between said stop means and said projection means so as to be compressed by relative rotation of said first and second masses in a first direction; and fluid displacement chamber means adjacent said projection means for being filled with a damping fluid and thereby providing damping of relative motion of said projection means with respect to said stop means in a second direction opposite the said first direction.

To accomplish the foregoing objects, the second mass has projections which each extend into one of the fluid displacement chambers which are arranged at the outer circumference of the inner space defined by the side disks of the first mass. Each two of these projections surround between them a flexible element, preferably a spring, the spring itself being accommodated in a spring chamber. The spring chambers and the displacement chambers alternate with each other along the circumferential direction. The displacement chambers in the region of the projections have inside dimensions which are only slightly greater than the outside dimensions of the projections so as to maintain a minimal slot therebetween. To form an axial shoulder for supporting the springs via corresponding spring plates, the spring chamber is widened in the region of the springs.

By this arrangement the following is achieved: The projections arranged on the second mass fulfill three functions In each case two projections form a pair of projections between which the spring is retained via spring plates, in the central region. The spring plates, however, lie at the same time also against the shoulders of the side disks in the region of the spring chamber. When a torque is introduced, a first one of the projections receives the circumferential force and acts on the spring while the other second projection lifts off from the corresponding spring plate and moves into the displacement chamber adjacent to it. In this connection, it acts as a piston which, by displacing a damping medium through narrow slots between the projection and the adjoining walls, produces an effective damping of any oscillation.

Upon reversal of the direction of the force, the first projection lifts off from the spring plate and the second projection compresses the spring. Each projection, therefore, has a different function in each direction of stroke during the cyclic process, namely compressing the spring in the circumferential direction in one direction, or moving in the other direction to apply a damping force to the second mass during a stroke movement in the displacement chamber.

If the displacement chamber is limited in circumferential direction by a fixed spacer, then this provides an ultimate limit for the stroke of the projection and thus the second mass. This is a third function of the projection. It comes to rest against the spacer when large amplitudes of motion occur, with effective hydraulic buffering.

The arrangement of the damping device at the outer circumference of the inner space permits a space-saving arrangement in the region between the springs, the structural expense being reduced, in particular, by the fact that several functions are performed by the projections.

Thus, according to another highly advantageous feature, the invention provides a damping force which is variable as a function of the engine torque and thus the angle of rotation. The projections serve as a damping piston in the circumferentially-oriented displacement chambers, and the projections also bear against springs in the spring enclosures, which are also circumferential. The greater the amplitude of vibration and accordingly, the angle of rotation, the greater the damping, since on the one hand the projections compress the springs farther and on the other hand, the projections travel over a greater path within the damping fluid displacement chambers. On the other hand, a small angle of rotation results only in slight damping, primarily provided by the spring In particular, no steps are required to be formed in the projections or chambers as they are in the German '748 reference, leading to a simpler and more economical structure, as a result of this dual function of the projections.

According to another aspect of the invention, an additional damping device is described, including a combination of hydraulic damping via additional fluid displacement chambers, with frictional damping via structural parts which can be pressed axially against a further projection on the second mass. Such an additional damping device may be necessary or desirable according to the oscillation behavior of the drive engine.

Other objects, features and advantages of the invention will be understood from the following description of an embodiment thereof, with reference to the drawings.

BRIEF DESCRIPTION OF THE DRAWINGS

FIG. 1 shows resonance curves of two previously known elastic couplings A, B as well as for an elastic coupling C in accordance with the invention, wherein the vibration amplitude (amplitude enlargement factor V) is plotted against the frequency of rotation n.

FIG. 2 shows diagrammatically the basic construction of the elastic coupling of the invention.

FIG. 3 is a partial cross-sectional view of the elastic coupling.

FIG. 4 is a longitudinal cross-section through the elastic coupling, taken along section line IV of FIG. 3.

FIG. 5 is a longitudinal cross-section through the elastic coupling, taken along the section line V of FIG. 3.

FIG. 6 is a partial circumferential view showing part of the elastic coupling in the region of one fluid displacement chamber.

FIG. 7 is a longitudinal cross-section through the elastic coupling, taken along the section line VII of FIG. 3.

DETAILED DESCRIPTION

In the curves of FIG. 1, the resonance curve A represents the behavior of an elastic coupling having slight damping. It shows a large rise in the vibration amplitude V when passing through resonance and good damping of undesired oscillations in the hypercritical operating range, above or below resonance. Curve B shows the behavior of an elastic coupling having a high degree of damping. Curve C represents the ideal course, namely a slight rise in V in the resonance region with, at the same time, excellent oscillation damping in the hypercritical region—namely, the behavior of an elastic coupling in accordance with the invention.

The diagram of FIG. 2 shows the following in detail: A first mass 1 is driven by an engine (not shown); a third mass 12 drives a transmission (not shown). Between them there is a second mass 6. The transmission of force takes place as follows.

Adjoining the first mass 1, there is a first spring element 8, in this case represented merely by a shaft; this is followed by the second mass 6; adjoining this there is a second spring 13, again represented only as a shaft. Damping devices, shown diagrammatically, are associated with the two springs 8 and 13, being connected in each case in parallel with the springs.

The following description of an embodiment of the invention will refer, in particular, to the damping device 15, namely an elastic coupling, between the first mass 1 and the second mass 6.

The construction of the elastic coupling 15 of the invention can be noted from FIGS. 3 to 6. The first mass 1 comprises two side disks 2 and 3 which enclose a liquid-tight inner space 5 between them, within which space the second mass 6 and the third mass 12 are enclosed. Several springs 8, oriented in the circumferential direction, are arranged between the side disks 2 and 3, on the one hand, and the second mass 6, on the other hand. These springs 8 form the first spring element. A second spring element is located between the second mass 6 and the third mass 12, comprising a plurality of springs 13 arranged in the circumferential direction. The latter are inserted into coinciding cutouts 14 in the second and third masses. Preferably the first spring element provides greater stiffness than the second spring element.

For supporting the first springs 8, there are provided spring plates 10 which normally rest against respective projections 7 which extend radially outward from the second mass 6. The spring plates 10 and projections 7 are spaced apart in the circumferential direction. As can be noted in particular from FIG. 6, the spring plates 10 normally lie simultaneously against axial shoulders 11 on the two side disks 2 and 3, and are held there by the force of the spring 8 The springs 8 move within spring chambers 9.

When the first mass 1 (comprising side disks 2 and 3) rotates relatively with respect to the second mass 6, one of the projections 7 transmits the circumferential force to the corresponding spring plate 10. This force-transmitting projection causes the corresponding spring plate to lift off of its pair of shoulders 11. The other spring plate remains resting against its pair of shoulders 11, and the corresponding projection 7 lifts off from the spring plate 10 in the direction of relative rotation of the second mass 6. Upon reversal of the direction of force of the second mass 6, the same takes place but what happens at the two ends of the spring is reversed.

The shoulders 11 which support the spring plates 10, together with the side disks 2 and 3, enclose a displacement chamber 16 in the axial direction. The projections 7 extend axially into the displacement chamber 16, as best seen in FIGS. 4 and 6, and have an axial thickness which is smaller than the inside diameter of the displacement chambers 16 by the width of slot 17 (see FIG. 4). Between the two side disks 2 and 3 are spacers 4 which, on the one hand, hold the two side disks together but, on the other hand, represent the limiting wall of the displacement chamber in the circumferential direction. The projections 7 thus move in the circumferential direction within the displacement chambers 16 in a manner similar to a piston in a cylinder.

The projections 7 thus have three main functions. On the one hand, they transmit the circumferential force produced by relative movement of the first and second masses, from the second mass via the springs to the first mass. On the other hand, they transmit a damping force which is produced by their movement within the damping chambers 16 and by the displacement of the damping medium present in the inner space 5 and the displacement chambers 16, through the slots 17. Since the spring chambers 9 and the displacement chambers 16 alternate in the circumferential direction, in each case one of the projections 7 of each pair of projections, together with the spring 8 clamped between them, will transmit the circumferential force, while the other projection of such pair applies the damping force in the adjacent displacement chamber. Each spring plate 10 forms a wall of a displacement chamber 16 in the circumferential direction, the spring plate being pressed firmly against the shoulders 11 as a result of the instantaneous direction of the force. The third main function of the projections 7 is to guide the second mass axially between the side disks 2, 3.

FIGS. 3 and 7 show a second damping device 18 and another function of the projections. It comprises a second projection 20, which is also part of the second mass 6, and a second displacement chamber 19, defined by the radially extending walls of the spacer 4 and by a friction device. The friction device comprises two friction jaws 21 which are pressed by springs 22 axially against the projections 20. At the same time, the projection 20 also develops a hydraulic damping force since it displaces damping fluid via the slot 23 in both directions of movement within the additional displacement chamber 19 This additional damping device having the friction device may be necessary if the damping of the elastic coupling which results from the damping force developed by the projection 7 in the displacement chamber 16 is not sufficient in certain cases of use.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A disk-type elastic coupling usable in a multi-mass flywheel in the drive train of a motor vehicle with an internal combustion engine, wherein:
   (a) a first elastic coupling half constitutes a first mass and has at least two mutually opposing side disks which have a common axis defining an axial direction, and which form a liquid-tight inner space which can be filled with a damping fluid;
   (b) within the inner space is a second mass which is guided against axial displacement by the side disks and is connected to the first mass via first elastic means;
   (c) within the inner space is a third mass representing a second elastic coupling half and being connected to the second mass via second elastic means;
   (d) the three masses are connected in series in the direction of transmission of the engine force via the first and second elastic means and are turnable to a limited extent with respect to each other;

(e) at least one damping means for damping relative movement of said first and second masses comprises a plurality of fluid displacement chambers for said damping fluid which are arranged circumferentially in said inner space and said damping means is connected in parallel with the first elastic means;

(f) the second mass has projections fixed thereon for rotation with it, each of them extending into one of the fluid displacement chambers;

(g) said first elastic means comprises a plurality of elastic elements and each two adjacent projections form a pair of projections and enclose between them one of the elastic elements;

(h) each two adjacent displacement chambers enclose between them a spring chamber;

(i) each spring chamber has a greater inside diameter than the two adjoining displacement chambers in order to form an axial shoulder at each end of said spring chamber;

(j) each elastic element is retained in its respective spring chamber by a pair of spring plates which rest against the axial shoulders so as to be movable into the spring chamber by respective adjacent projections, whereby said elastic elements retained between said spring plates are compressed by relative rotation of said first and second masses in a first direction; and said projections and fluid displacement chambers provide damping of relative rotation of said first and second masses in a second direction opposite said first direction; and (k) an additional damping means comprises an additional fluid displacement chamber, said additional fluid displacement chamber being at least partially defined by friction means comprising a pair of friction jaws secured to said first means, and means for applying an axial force to the two friction jaws within the additional fluid displacement chamber, which force presses said jaws against axial side surface of an additional projection on the outer region of the second mass for generating a frictional damping force.

2. An elastic coupling according to claim 1, wherein each said elastic means comprises a compression spring.

3. An elastic coupling according to claim 2, wherein said fluid displacement chambers closely enclose the projections in the axial direction so as to guide movement of said projections between the side disks.

4. An elastic coupling according to claim 2, wherein each fluid displacement chambers is arranged in the radially outer region of the inner space of the first mass and the projections of the second mass are directed radially outward into said fluid displacement chambers.

5. An elastic coupling according to claim 4, wherein said fluid displacement chambers closely enclose the projections in the axial direction so as to guide movement of said projections between the side disks.

6. An elastic coupling according to claim 1, wherein the first elastic means arranged between the first and second means have greater stiffness than the second elastic means between the second and third masses.

7. An elastic coupling according to claim 6, wherein said first and second elastic means comprise respective compression springs.

8. An elastic coupling according to claim 1, wherein spacer means are arranged for spacing the side disks of the first mass from each other and defining a travel limit for the projections.

9. An elastic coupling according to claim 1, wherein said fluid displacement chambers closely enclose the projections in the axial direction so as to guide movement of said projections between the side disks.

* * * * *